Aug. 8, 1961 J. TELLERMAN 2,995,736
ANALOG TO DIGITAL TRANSDUCER
Filed Feb. 8, 1960
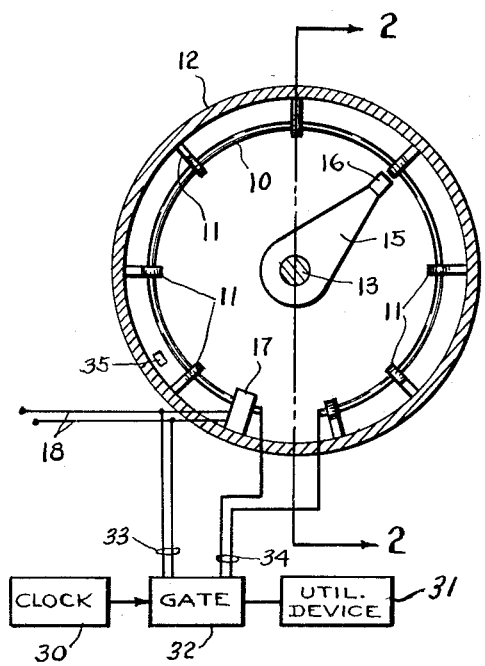
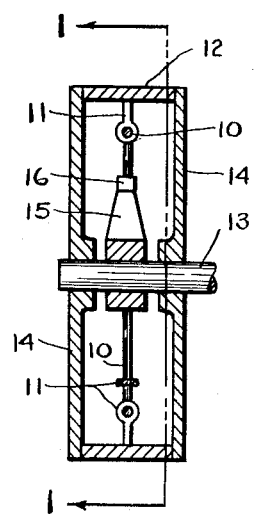
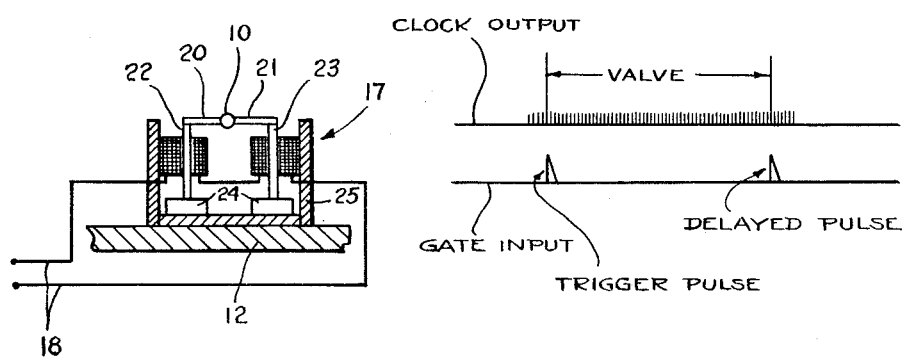
INVENTOR.
JACOB TELLERMAN
BY
Raymond A. Paquin
ATTORNEY.

United States Patent Office 2,995,736
Patented Aug. 8, 1961

2,995,736
ANALOG TO DIGITAL TRANSDUCER
Jacob Tellerman, Brooklyn, N.Y., assignor to American Bosch Arma Corporation, a corporation of New York
Filed Feb. 8, 1960, Ser. No. 7,395
8 Claims. (Cl. 340—347)

The present invention relates to digital computers and has particular reference to means for converting from analog to digital representation of values.

The problem of conversion of data from analog form to digital form for processing in a digital computer is one of the areas which has fallen behind in the digital art. The mechanical and optical converters now available share shortcomings of mechanical unreliability and numerical ambiguity which necessitate special codes and logic and mechanical structures of considerable size and weight in order to make them suitable for precise and reliable use in taxing environmental surroundings.

The present invention solves this problem by using apparatus which employs no physical contacts and does not require massive construction to maintain its precision in a hostile environment. It is based upon the use of magnetostrictive devices which generate and sense the presence of a sonic pulse in a metal wire used as a transmission line for the pulse. It has been noted that if the transmission line is itself ferro-magnetic, no magnetostrictive sensor is required. The interaction between the mechanical energy of the pulse and the portion of the line polarized by the presence of a magnet is itself sufficient to cause the transmission line to act as a generator and, therefore, to develop a readable potential across the line itself.

The invention takes advantage of the Wiedeman Effect which states that a voltage is generated across a magnetic wire when twisted in the presence of a magnetic field. In the converter a twist stress is transmitted along a wire and travels at a definite speed. When a magnet is placed along the wire a pulse is generated across the wire as the twist passes this magnet. The pulse generated across the wire will be delayed from the pulse initiating the twist by a time interval defined by the length of travel of the pulse along the wire until it passes the magnet.

The device essentially generates a pulse delayed from a trigger pulse by a time related very accurately to a shaft position. The time interval between the two pulses can be registered by a counter, by allowing it to count a precision frequency reference carrier whereby the trigger pulse starts the counter while the delayed pulse stops the count.

The distance of the magnet from the transducer is made a precise function of time, and the number a direct function of position. The distance of the magnet from the transducer, in rational units, is expressed by the count accumulated during the time required for the pulse to travel from the transducer to the magnet.

Resolution of such a measurement depends upon the time required for a pulse to traverse the entire length of the wire and the frequency of the counting signal. If the time can be made larger, a greater number of cycles of the signal can be accumulated; and increasing frequency can also increase the resolution.

In a preferred embodiment of the present invention, the ferro-magnetic wire is deployed circularly about a central shaft, and a magnet, in juxtaposition to the wire, is carried at the end of an arm which is attached to a shaft. The shaft is rotated by the analog input, and the digitally converted signal is obtained by accumulating a count of cycles started by a signal to a twist transducer at the end of the wire and stopped by the electrical signal generated across the end of the wire.

Introduction of a torsional pulse into the wire at time $T_0$ will result in a detectable pulse at time $T_0+\Delta T$, $\Delta T$ representing the time required for the pulse to travel from the point at which it had been introduced, to the place at which a magnet is positioned. $\Delta T$ is also a measure, with excellent precision, of the distance along the wire between the transducer and the magnet. This time is also a function of the analog position to be converted to a digital number.

By utilizing the input pulse to start a counting instrument such as events per unit time indicator, and the output to stop that instrument, the count accumulated from an external clock generator is a measure of the distance between the transducer and the magnet.

The advantages of this invention over those converters in present use are that all electrical connections are fixed, there are no sliding contacts, there is no shaft loading by friction, and very little inertia is added to the shaft by the small magnet. Also, note that this device lends itself to great accuracy, linearity, stability and comparatively very small physical size by taking advantage of the helical magnetic wire layout similar to a helical potentiometer type construction.

For a more complete understanding of the invention, reference may be had to the accompanying diagrams, in which FIG. 1 is a view of a preferred embodiment of the invention taken through line 1—1 of FIG. 2;

FIG. 2 is a sectional view taken through line 2—2 of FIG. 1;

FIG. 3 is a detailed view of a portion of FIG. 1; and

FIG. 4 illustrates the operation of the invention.

With respect to FIGS. 1 and 2, a ferro-magnetic wire 10 is supported by spaced supports 11 placed about the inner circular periphery of a casing 12. A shaft 13 is journalled in the end plates 14 of the casing 12. An arm 15 is attached to the shaft 13 and carries at its extremity a small magnet 16 which is positioned very closely to the wire 10, but is not in contact therewith and has its magnetic poles parallel to the wire 10. A torsional transducer 17 is attached to the casing 12 and to one end of wire 11 and is adapted to apply a torsional stress pulse to the wire 10 upon application of a current pulse to the electrical leads 18. A typical torsion transducer is illustrated in FIG. 3 although the choice is not to be limited thereby.

The inner ends of a pair of lever arms 20, 21 are attached to the wire 10 at diametrically opposite points. Their outer ends are supported by magnetostrictive members 22, 23 respectively which terminate in acoustic damping material 24 attached to the frame 25. The frame 25 also supports a pair of electromagnetic coils 26, 27 which surround the members 22, 23 respectively. The coils 26, 27 are electrically connected together and to the wires 18 in a manner such that an electrical pulse in the wires 18 will cause one support member 22, for example, to elongate and the other member 23 to contract. Thus a current pulse in wires 18 will apply a twist or torsional pulse to the end of wire 10. In an alternative arrangement, the lever arms 20, 21 may be omitted and the members 22, 23 will be attached directly to diametrically opposite points on the wire 10.

To complete the preferred embodiment, the output of a frequency generator or clock 30 is applied to a utilization device 31 through a gate 32. The device 31 may be a memory device of a computer for example, which counts the number of pulses applied to it and stores this count as a digital number. The output of the clock 30 is a precisely controlled series of pulses generated at a relatively high frequency. The gate 32 is opened to allow the signal from the clock 30 to enter the utilization device whenever a pulse is applied to the leads 33 and is closed to inhibit the passage of signals between the clock 30 and device 31 as soon as a current pulse is applied to leads 34.

In operation of the device shown, the shaft 13 is rotated according to an analog value from its zero position, whence the distance between transducer 17 and magnet 16 measured along the ferro-magnetic wire 10 is proportional to this analog input.

In order to perform the conversion from the analog indication to digital representation, a pulse is applied to wires 18 which causes a twisting or torsional pulse to be applied to wire 10 by transducer 17, and simultaneously opens the gate 32, since wires 33 are connected to the wires 18. The utilization device 31 counts the pulses from clock 30 as the twist pulse in wire 10 moves along the wire to the position opposite magnet 16. When the pulse reaches magnet 16 an electrical voltage is induced across the ends of wire 10 according to the Wiedeman Effect which is a well-known phenomenon in physics. The ends of the wire 10 are connected to the leads 34 of gate 32 and, upon generation of the voltage in wire 10, the signal in leads 34 closes the gate 32 to stop the accumulation of pulses in the device 31. Thus, the pulses stored in device 31 digitally represents the analog value according to which shaft 13 is displaced.

The result may be visualized by reference to FIG. 4 in which the number of pulses from clock 30 between a trigger pulse and a delayed pulse applied to the gate 32 are counted in a counting device 31. The trigger pulse is that applied to lines 18 while the delayed pulse is that obtained from the ends of the wire 10. The distance between the pulses is the analog of the value, while the number of accumulated pulses is the digital representation. The relationship between the analog scaling and the clock frequency must be preselected to give the correct number of pulses in the given time between the trigger and delayed pulse. The scaling depends upon the propagation rate for the torsional pulse and will be different for different materials.

In a modification used to reduce effects of discontinuity in the vicinity of the torsion transducer, the gate 32 may be opened by an initial pulse at wire 34 produced as the pulse passes a stationary magnet 35 placed adjacent the wire 10, instead of by the pulse at wires 18 which actuates the transducer 17. The count is stopped, as before, as the torsional pulse passes the magnet 16. The analog quantity measured in this case is the distance along wire 10 between the two magnets 35 and 16. In this modification, the magnets 35 and 16 may be oriented so as to produce pulses of opposite polarity to identify the start and stop of the counting process, if desired.

As a quantitative illustration consider the following examples. Most of the materials dealt with to date have propagation rates of about $10 \times 10^{-6}$ seconds per inch. A wire bent about a 3 inch radius as an 18.8 inch length and, assuming the propagation ratio of $10 \times 10^{-6}$ seconds per inch, has an approximate delay of $188 \times 10^{-6}$ seconds. Assuming further a count of one pulse for each degree, a count of 360 pulses in the $188 \times 10^{-6}$ seconds allotted would require an interval of $.522 \times 10^{-6}$ between pulses or a count of $1.9 \times 10^6$ cycles per second. Using a commercial counter with a conservative counting rate of $10 \times 10^6$ c.p.s. and a $\pm 2$ count error results in a resolution of $.2°$ with an error of $\pm 2°$. Better accuracy may be obtained by a number of means. Faster counters, larger diameter wire and multi-turn construction will add accuracy. However, increased length will increase the attenuation and some compromise between wire length and attenuation must be reached. While the propagation rate remains unchanged, bending the line has a marked effect on the attenuation, increasing the losses. Additional losses depend upon the manner in which the line is supported each point of contact contributing some loss by introducing a damping effect on surface discontinuity. The success of the instrument depends in great measure upon the use of short lines. These lines, however must not be so short that their curvature introduces increased attenuation, and thus defeats the benefit obtained from decreased length. On the other hand, the multi-turn potentiometer technique can be used to increase resolution. Every turn added reduces the required count rate by one half so that two turns lies within reach of commercial counters and five, ten or more are possible. However, the multi-turn device requires gears of high precision, introduces additional attentuation into the signal, and prevents continuous rotation.

The description has concentrated on the use of the transducer of this invention in an analog to digital converter. However, in its broader aspects, it will be seen that the transducer is eminently useful as a variable delay for any purpose, wherein a pulse input to the torsion transducer at one end of the wire will be picked up as an electrical pulse across the ends of the wire after a certain time delay, specified by the physical displacement between the magnet on the arm 15 and that end of the wire to which the torsional pulse applied. Such a variable time delay device will find utility in circuits too numerous to list, but they will be recognized by the presence of conventional fixed delay lines which can be replaced by the variable delay line of this invention.

I claim:

1. In an analog to digital transducer, a ferro-magnetic wire, a magnet adjacent said wire, means for applying a twist pulse at one end of said wire, means for displacing said magnet from said twist applying means according to a value, pulse generation means, counting means connected to said pulse generation means, a gating interposed between said pulse generation means and counting means, said gating means being opened by the application of a signal to said means for applying a twist pulse and closed by an electrical signal across the ends of said ferro-magnetic wire.

2. In an analog to digital transducer, a ferro-magnetic wire, a magnet adjacent said wire, means for applying a twist pulse at one end of said wire, means for displacing said magnet from said twist applying means according to a value, pulse generation means, counting means connected to said pulse generation means, a gating means interposed between said pulse generation means and counting means, said gating means being opened by the application of a signal to said means for applying a twist pulse and closed by an electrical signal across the ends of said ferro-magnetic wire, said wire being disposed in circular form and said magnet is mounted for rotation about the center of said circularly disposed wire.

3. In an analog to digital transducer, a ferro-magnetic wire, means for applying a twist to one end of said wire in response to a trigger pulse, a magnet adjacent said wire for generating a delayed pulse across the ends of said wire, and means for ascertaining the time interval between said trigger pulse and said delayed pulse.

4. In an analog to digital transducer, a ferro-magnetic wire, means for applying a twist to one end of said wire in response to a trigger pulse, a magnet adjacent said wire for generating a delayed pulse across the ends of said wire, and means for ascertaining the time interval between said trigger pulse and said delayed pulse, said wire being disposed in circular form and said magnet is mounted for rotation about the center of said circularly disposed wire.

5. In an analog to digital transducer, a ferro-magnetic wire, means for applying a twist to one end of said wire in response to a trigger pulse, a magnet adjacent said wire for generating a delayed pulse across the ends of said wire, and means for ascertaining the time interval between said trigger pulse and said delayed pulse and using said time interval for obtaining a digital representation of the distance between said means for applying a twist and said magnet.

6. In a time delay device, a ferro-magnetic wire, means for applying a twist to one end of said wire in response to a trigger pulse, a magnet adjacent said wire for generating a delayed electrical pulse across the ends of said wire.

7. In a time delay device, a ferro-magnetic wire, means for applying a twist to one end of said wire in response to a trigger pulse, a magnet adjacent said wire for generating a delayed electrical pulse across the ends of said wire, means for varying the position of said magnet adjacent said wire with respect to said twist applying means for varying the delay time.

8. In a time delay device, a ferro-magnetic wire, means for applying a twist to one end of said wire in response to a trigger pulse, a magnet adjacent said wire for generating a delayed electrical pulse across the ends of said wire, said wire being disposed in circular form and said magnet being mounted for rotation about the center of said circularly disposed wire.

No references cited.